United States Patent [19]

Stedman

[11] 4,049,071
[45] Sept. 20, 1977

[54] MODULAR DUAL WHEEL SUSPENSION AND DRIVE ARRANGEMENT FOR TRUCKS

[75] Inventor: Robert N. Stedman, Chillicothe, Ill.

[73] Assignee: Caterpillar Tractor Co., Peoria, Ill.

[21] Appl. No.: 664,849

[22] Filed: Mar. 8, 1976

[51] Int. Cl.² .................................................. B62D 61/10
[52] U.S. Cl. .............................. 180/24.05; 180/24.07; 180/24.13; 180/54 F; 180/73 TL
[58] Field of Search ............... 180/24.05, 24.06, 24.07, 180/24.08, 24.13, 54 F, 55, 56, 63, 65 R, 65 F, 73 TL

[56] References Cited

U.S. PATENT DOCUMENTS

| | | | |
|---|---|---|---|
| 1,728,891 | 9/1929 | Kemble | 180/24.13 X |
| 2,082,001 | 6/1937 | Hanson | 180/24.07 |
| 3,027,959 | 4/1962 | Mailliard | 180/65 F X |
| 3,378,095 | 4/1968 | Sons | 180/75 |
| 3,727,711 | 4/1973 | Sebern | 180/24.05 |
| 3,773,348 | 5/1972 | Davis | 280/124 A |
| 3,786,888 | 1/1974 | Nelson | 180/24.05 X |

FOREIGN PATENT DOCUMENTS

| | | | |
|---|---|---|---|
| 1,530,852 | 5/1969 | Germany | 180/73 TL |
| 601,595 | 8/1934 | Germany | 180/73 TL |
| 301,223 | 11/1928 | United Kingdom | 180/24.05 |
| 444,790 | 3/1936 | United Kingdom | 180/24.07 |

*Primary Examiner*—Joseph F. Peters, Jr.
*Assistant Examiner*—Terrance L. Siemens
*Attorney, Agent, or Firm*—Phillips, Moore, Weissenberger, Lempio & Majestic

[57] ABSTRACT

The main frame of a truck has a pair of dual wheel suspension and drive arrangements pivotally mounted rearwardly thereon and disposed in laterally spaced relationship relative to each other. Each arrangement comprises a hollow sub-frame having its forward end pivotally mounted on the main frame by a ball and socket connection and its rearward end pivotally connected under the main frame by a suspension cylinder. A pair of roadwheels are rotatably mounted on either side of the sub-frame and driven by a common drive axle. The power input to the drive axle comprises a drive motor mounted on an inboard side of the sub-frame and drivingly connected to the axle by an intermediate gear train disposed within the hollow sub-frame.

11 Claims, 4 Drawing Figures

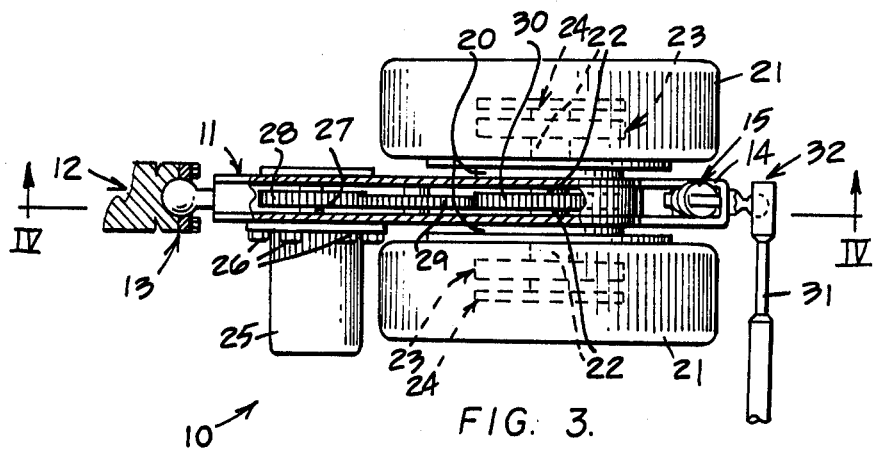
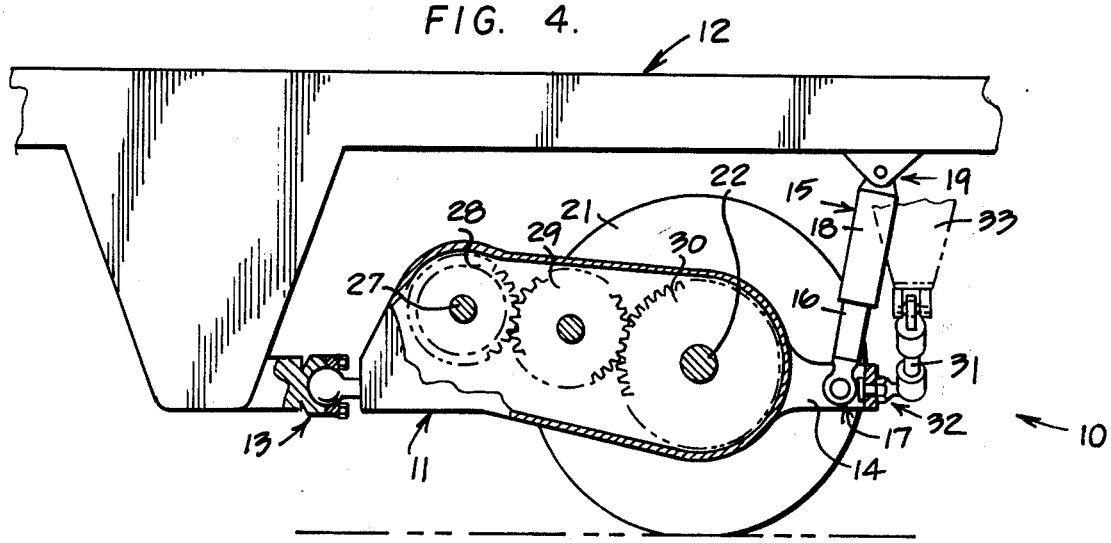
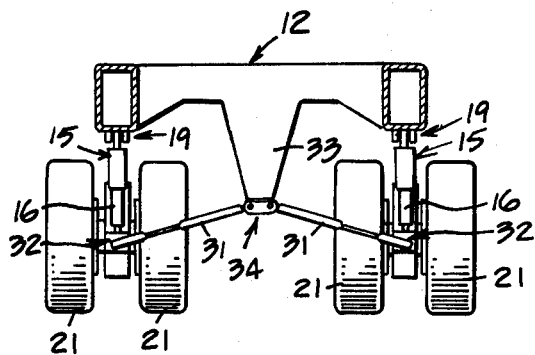
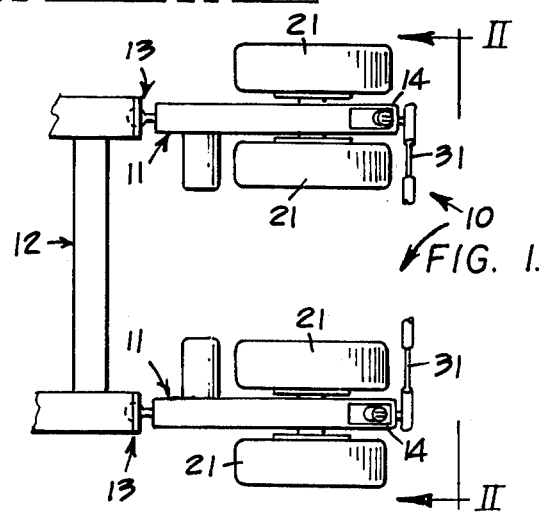

MODULAR DUAL WHEEL SUSPENSION AND DRIVE ARRANGEMENT FOR TRUCKS

BACKGROUND OF THE INVENTION

A conventional truck comprises a differential for driving the rear roadwheels thereof. The differential is normally mounted in a housing which is suspended under a main frame of the truck by a pair of laterally spaced suspension cylinders. The differential receives its power in a conventional manner from an internal combustion engine and intermediate transmission to provide the power input to the roadwheels. Such a standard suspension and drive arrangement gives rise to manufacturing and servicing problems, as well as providing limited ground clearance thereunder.

SUMMARY OF THIS INVENTION

An object of this invention is to provide a modular rear axle suspension and drive arrangement for trucks which is adapted to facilitate manufacture and servicing thereof and also provides substantial ground clearance thereunder. In addition, such arrangement places operating components thereof in protected areas within the arrangement to prevent damage thereto.

The modular axle suspension and drive arrangement comprises a hollow sub-frame adapted to have its forward end pivotally mounted on a main frame of a truck. The sub-frame is further adapted to have its rearward end suspended under such main frame by a suspension cylinder. A drive motor is mounted on the sub-frame and has its output shaft drivingly connected to a roadwheel, rotatably mounted on a spindle secured to the sub-frame, by drive means disposed entirely within the sub-frame. In the preferred embodiment of this invention, such drive means comprises the plurality of intermeshing spur gears rotatably mounted within the sub-frame.

BRIEF DESCRIPTION OF THE DRAWINGS

Other objects of this invention will become apparent from the following description and accompanying drawings wherein:

FIG. 1 is a top plan view of a pair of modular dual wheel suspension and drive arrangements of this invention, each having a forward end thereof pivotally mounted on a partially illustrated main frame of a truck;

FIG. 2 is a rear elevational view of the suspension and drive arrangements, taken in the direction of arrows II—II in FIG. 1;

FIG. 3 is an enlarged and partially sectioned top plan view of one of the suspension and drive arrangements; and FIG. 4 is a view taken generally in the direction of arrows IV—IV in FIG. 3, showing the suspension and drive arrangement in said elevation and mounted under the main frame of the truck.

DETAILED DESCRIPTION

FIGS. 1 and 2 illustrate a pair of substantially identical dual wheel suspension and drive arrangements 10 each comprising a sub-frame 11 having its forward end universally pivoted to a main frame 12 of a truck by a ball and socket connection 13. Referring to FIGS. 3 and 4, a rearward extension 14 of each suspension and drive arrangement is mounted and suspended under a longitudinal beam of main frame 12 by a conventional suspension cylinder 15. The cylinder comprises a strut 16 having its lower end universally pivoted on extension 14 of the sub-frame by a ball and socket connection 17.

The upper end of the strut is reciprocally mounted in a housing 18, having its upper end universally pivoted to frame 11 by a ball and socket connection 10. The cylinder functions in a conventional manner to absorb loading shocks and haul load bumps to provide a smooth ride and to reduce stresses which would otherwise be imposed on the interrogated components of the truck. For example, the cylinder may be of the conventional type whereby upon movement of the truck over uneven terrain, strut 16 will move upwardly in housing 18 to compress a volume of nitrogen contained therein. This movement will force oil into a rebound chamber through orifices (not shown) formed in the cylinder.

Upon dropping of sub-frame 11 relative to main frame 12, the compressed nitrogen functions to push the strut in a smooth manner, back to its normal position illustrated in FIG. 4. The orifices and a ball check valve (not shown) function to control oil flow and rebound rate to prevent harsh rebounding. As mentioned above, the suspension cylinder is conventional and thus further detailed description thereof is deemed unnecessary hereat.

As more clearly shown in FIG. 3, a pair of tubular spindles 20 are secured by welds, bolts or the like on either side of sub-frame 11. The coaxially aligned spindles each rotatably mount a roadwheel 21 thereon in a conventional manner. A common drive shaft 22 is rotatably mounted on the sub-frame and in the spindles to provide the power input to the roadwheels.

If so desired, a standard single planetary gear set 23 may be operatively connected in a conventional manner between the drive axle and each of the roadwheels to provide a stepped-down gear ratio therebetween. In addition, a standard brake package or braking means 24 may be suitably connected between each spindle and roadwheel in the final drive for selectively braking the roadwheels in a conventional manner. The power input means to drive axle 22 comprises an electric or hydraulic motor 25 detachably mounted on an inboard side of sub-frame 11 by a plurality of circumferentially disposed bolts 26. The motor has an output shaft 27 that extends into the hollow sub-frame to drive axle via a stepped-down gear train and speed reducer, constituting drive means drivingly interconnected between the drive motor and the axle.

In particular, a first spur gear 28 is secured on an end of motor shaft 27 and meshes with a second or intermediate spur gear 29, rotatably mounted on the sub-frame which further functions as a transfer gear case. The intermediate spur gear meshes with a third spur gear 30, disposed in tandem relationship relative to the other spur gears, secured on drive axle 22. It can thus be seen that such gear train will effect a first speed reduction from the motor to the roadwheels whereas planetary gear set 23 will effect a second such speed reduction.

Referring to FIGS. 2 and 4, a stabilizer bar or tag link 31 is pivotally interconnected between extension 14 of each subframe 11 and main frame 12 of the truck. The tag link, disposed generally horizontally and transversely relative to the sub-frame and a longitudinal axis of the truck, has its outer end universally connected to extension 14 of the sub-frame by a ball and socket connection 32. The inner end of the tag link is pivotally mounted on an extension 33 of frame 12, disposed intermediate its lateral width, by a ball and socket connection 34 (FIG. 2).

From the above description it can be seen that this invention provides a modular dual wheel suspension and drive arrangement which affords manufacture, servicing and operating desiderata over conventional rear axle suspension and drive arrangements. The arrangement of this invention can be subassembled as a complete module prior to its attachment to truck frame 12 at ball and socket connections 13, 19 and 34. Should a roadwheel 21 or one of the drive components of the arrangement require servicing, ball and socket connections 19 and 34 may be disconnected and truck frame 12 jacked-up to permit the arrangement to remain at ground level for accessibility, due to its pivoting about ball and socket connection 13.

It should be further noted that the lateral spacing of arrangements 10 (FIGS. 1 and 2) provides substantial ground clearance beneath truck frame 12. In addition, the positioning of suspension cylinders 15 directly under the longitudinal beam members of the truck frame and the wide lateral spacing thereof provides "soft" cylinder operating modes of operation to reduce transfer of shock loads to the vehicle. Such arrangement also maintains a very stable base and further provides a substantial increase in the life expectancy of drive motors 25 and their associated drive components.

The motors, being mounted on the inboard sides of the sub-frames and quite high thereon, are thus placed in protected areas and yet allow easy removal thereof for servicing purposes. The individual suspension and drive arrangements also eliminate the need for conventional differentials and axle housings, normally used on trucks. Also, should a brake 24 of one arrangement 10 fail, the brake employed with the other arrangement may still prove operable for vehicle braking purposes.

I claim:

1. A modular axle suspension and drive arrangement attached to a main frame of a vehicle comprising a hollow sub-frame, said main frame at least partially overlying said sub-frame, connection means universally pivoting a forward end of said sub-frame to a rearward end of said main frame, a drive motor, having an output shaft, mounted on said sub-frame, at least one roadwheel rotatably mounted on said sub-frame, and drive means disposed entirely within said sub-frame and drivingly interconnected between the output shaft of said drive motor and said roadwheel for driving the same.

2. The arrangement of claim 1 wherein a pair of spindles are secured in axial alignment on either side of said sub-frame and wherein a said roadwheel is rotatably mounted on each of said spindles and said drive means is disposed axially between said roadwheels and is operatively connected to a common drive axle for said roadwheels.

3. The arrangement of claim 1 wherein said drive means comprises a stepped-down gear train and a drive axle is rotatably mounted in a spindle secured to said sub-frame and is drivingly connected to said roadwheel.

4. The arrangement of claim 3 wherein said motor is mounted on an inboard side of said sub-frame.

5. The arrangement of claim 3 wherein said gear train constitutes a plurality of intermeshing spur gears disposed in tandem relationship relative to each other.

6. The arrangement of claim 1 further comprising a suspension cylinder pivotally interconnected between said main frame and said sub-frame.

7. The arrangement of claim 6 wherein said suspension cylinder is pivotally connected to a rearward end of said sub-frame and is universally connected to said main frame.

8. The arrangement of claim 7 further comprising a generally horizontally diposed tag link disposed in transverse relationship relative to said sub-frame and pivotally interconnected between said main frame and a rearward end of said sub-frame.

9. The arrangement of claim wherein said drive means comprises a plurality of spur gears disposed in tandem relationship relative to each other within said sub-frame.

10. The arrangement of claim 1 further comprising a common drive axle drivingly interconnected between said drive means and said roadwheel.

11. The arrangement of claim 1 wherein a pair of said arrangements, disposed in laterally spaced relationship relative to each other, are each universally pivoted to said main frame by a said connection means.

* * * * *